(12) United States Patent
Veiga

(10) Patent No.: US 6,823,579 B2
(45) Date of Patent: Nov. 30, 2004

(54) PORTABLE PLATFORM FOR USE IN GASKET MANUFACTURE

(75) Inventor: José Carlos Carvalho Veiga, Rio de Janeiro (BR)

(73) Assignee: Manegro Administracao E Participacoes LTDA., Rio de Janeiro (BR)

(*) Notice: Subject to any disclaimer, the term of this patent is extended or adjusted under 35 U.S.C. 154(b) by 208 days.

(21) Appl. No.: 10/083,660

(22) Filed: Feb. 27, 2002

(65) Prior Publication Data

US 2003/0160120 A1 Aug. 28, 2003

(51) Int. Cl.⁷ .......................... B23P 19/00; B23P 23/00
(52) U.S. Cl. ................... 29/564.7; 29/564.8; 29/33 K; 29/33 D; 29/33 S; 29/455.1; 29/417; 72/146; 72/148; 72/175; 72/174; 83/733
(58) Field of Search ............................ 29/564.8, 33 K, 29/564.7, 33 R, 564.1, 33 D, 33 Q, 33 S, 33 T, 455.1, 417; 72/146, 170, 173, 148, 175, 174; 83/733, 439

(56) References Cited

U.S. PATENT DOCUMENTS

| 8,501 | A | * | 11/1851 | Adams | 83/733 |
| 948,422 | A | * | 2/1910 | Lee | 83/733 |
| 3,905,090 | A | * | 9/1975 | Painter | 277/610 |
| 3,926,445 | A | * | 12/1975 | Farnam | 277/610 |
| 4,048,829 | A | * | 9/1977 | Thomas | 72/148 |
| 4,070,219 | A | * | 1/1978 | Farnam | 156/192 |
| 4,164,133 | A | * | 8/1979 | Damman | 72/175 |
| 4,361,335 | A | * | 11/1982 | Vinciguerra | 277/633 |
| 4,781,048 | A | * | 11/1988 | Richardson | 72/146 |
| 5,009,138 | A | * | 4/1991 | Rettie | 83/733 |
| 5,044,187 | A | * | 9/1991 | King | 72/175 |
| 5,044,245 | A | * | 9/1991 | Molleker et al. | 83/733 |
| 5,361,618 | A | * | 11/1994 | Stefanelli | 72/174 |
| 5,485,665 | A | * | 1/1996 | Marks et al. | 72/146 |
| 5,499,521 | A | * | 3/1996 | Luikart et al. | 72/173 |
| 6,195,867 | B1 | * | 3/2001 | Hashiguchi et al. | 29/455.1 |
| 6,665,925 | B1 | * | 12/2003 | Suggs et al. | 29/564.8 |

FOREIGN PATENT DOCUMENTS

| CH | 602214 A5 | * | 7/1978 |
| JP | 10-2422 A | * | 1/1998 |
| JP | 2000-145966 A | * | 5/2000 |

* cited by examiner

Primary Examiner—Erica Cadugan
(74) Attorney, Agent, or Firm—Smith, Gambrell & Russell

(57) ABSTRACT

The present invention comprises a portable platform (10) for use in gasket manufacture, comprising a shaft connected to a motor and can receive at least one mandrel, and a surface to receive at least one molding tool, the mandrel being activated by the motor to turn in relation to the platform (10) and to the tool, and to move gasket-forming elements, such as metallic or non-metallic strips, among others, to be processed by the tool. Moreover, as much the mandrel as with the tool are replaceable respectively between mandrels and tools with different characteristics. Thus, the same platform (10) may produce different types of gaskets, and, consequently, speed up and facilitate the gasket replacement process.

8 Claims, 4 Drawing Sheets

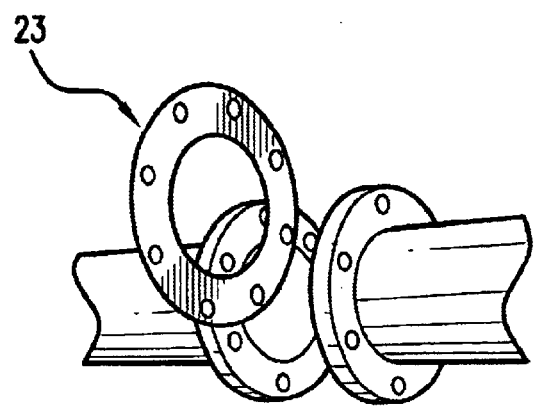
FIG.6
PRIOR ART
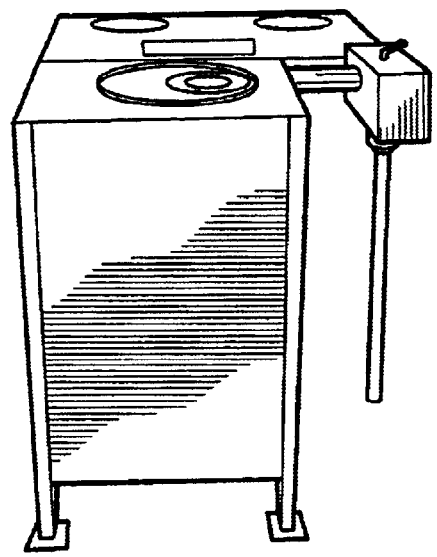
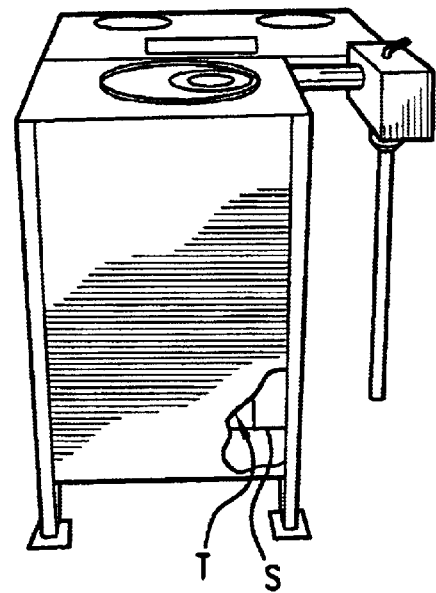
FIG.7       FIG.7A

PORTABLE PLATFORM FOR USE IN GASKET MANUFACTURE

The present invention features a portable platform for use in gasket seal manufacture.

FIELD OF THE INVENTION

Several gasket seals are known in the state of the art, especially those of the metallic spiral type spiral wound, double jacketed sleeves and cut non-metallic gaskets.

Figure 1:
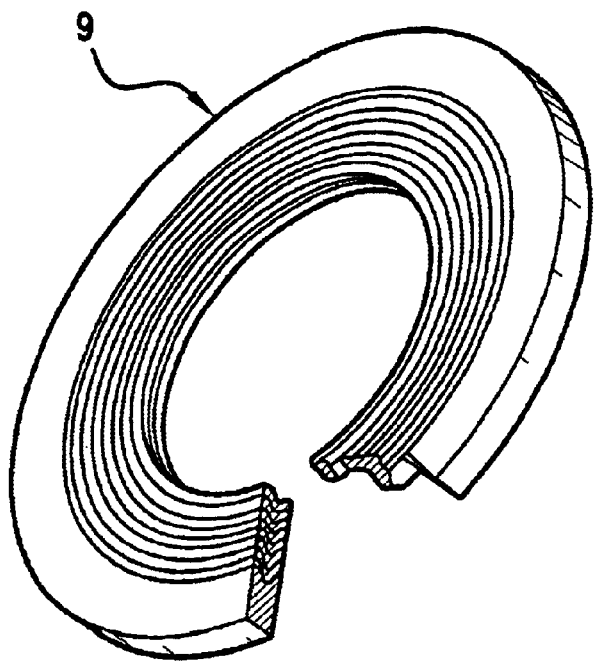

As shown in FIG. 1, spiral wound gasket 9 is a spiral constituted of a pre-formed metallic strip and a filling of softer material that, by interaction, provide the required sealing. When the initial pressing of the gasket takes place, the filling flows, thereby filling the imperfections of the flange surfaces. The metallic strip has the function of providing mechanical strength. Its 'V' format, like a chevron ring, allows the gasket to react like a spring, adapting to pressure and temperature variations.

This gasket may be manufactured with diverse combinations of materials, dimensions and shapes, usable in a growing range of applications and providing efficient sealing. Moreover, such gaskets are capable of withstanding high pressures and temperatures at quite low cost.

Figure 2:
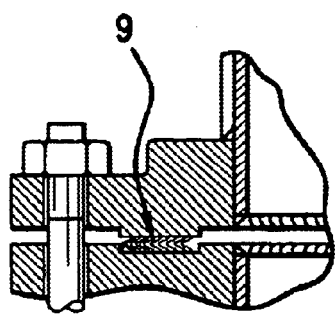
Figure 3:
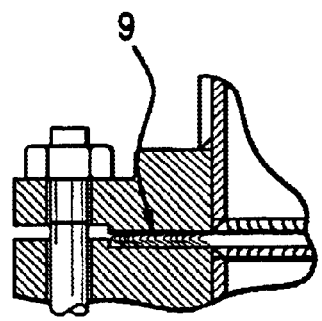

The simplest model of this type of gasket consists of only a circular spiral, without a centralization ring. Spiral gaskets 9 are used principally in flanges per ASME B.16.5 of the tongue and groove type, as illustrated in FIG. 2, or male and female, as illustrated in FIG. 3. They are also used in equipment, in which there are space and weight limitations, frequent in the chemical and petrochemical industries.

Spiral wound gaskets are manufactured by a simple process, in which a metallic strip together with another strip of non-metallic material are rolled over a metal or wooden mandrel until it forms a spiral, or rather, a spiral wound gasket. Consequently, mandrels of different diameters are utilized to produce gaskets of different diameters.

Another type of known gasket is the gasket of the double jacketed type, which is manufactured from two metallic sheets that are formed over a filler of soft non-metallic material. This gasket, 12, is illustrated in FIG. 4.

There are innumerable types of heat exchangers, many of which are so incorporated into our everyday lives that we take them for granted. In industry diverse types of heat exchanger, some possessing specific names, such as, radiators, boilers, chillers, etc. When we speak in a broad sense about heat exchangers, we may be referring to any of these apparatuses. However, in most industries, it is interpreted as a reference to shell and tube type of heat exchanger. As the name itself indicates, they are devices with a shell and tubes. One of two fluids circulates between the shell and the outside of the tubes and the other fluid inside the tubes.

Figure 4:
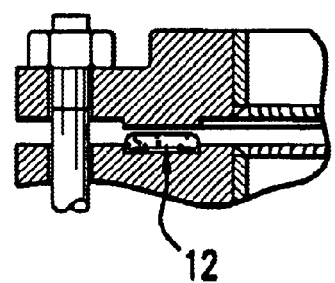
Figure 5:
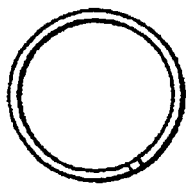
Figure 5:
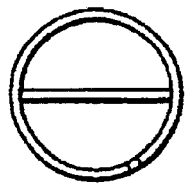
Figure 5:
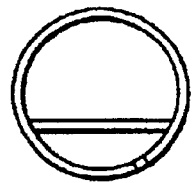
Figure 5:
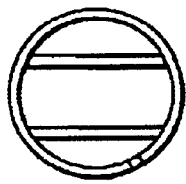
Figure 5:
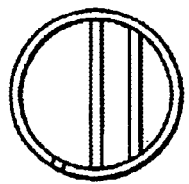
Figure 5:
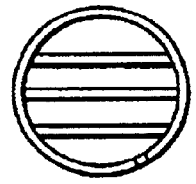

The double jacketed gaskets, shown in FIGS. 4 and 5, are the most commonly used in heat exchangers. They may be manufactured in various forms, sizes and with partitions for exchangers of with several passes. The primary seal is obtained in the internal side, where there is superimposition of the materials. At this point, the thickness is greater before seating, and the gasket becomes denser after the tightening, occurring the greatest flow of the material and effecting the seal. The outside of the gasket, which also possesses a greater thickness, acts as a secondary seal. The central part of the gasket does not participate decisively in the seal. FIG. 4 shows a sectional view of the double jacketed gasket 12 installed in a tongue and groove.

Due to the fact this type of gasket is quite widely used in heat exchangers, it does not possess standardized dimensions or forms, thereby making its manufacture unviable with a dedicated tool. FIG. 5 illustrates a top view of six typical formats for this type of gasket utilized in heat exchangers.

In the traditionally manufacturing process of double jacketed gaskets, their shape being drawn on a metallic sheet, and then cut out with scissors. The same procedure is followed with a second sheet and a soft filler. The already cut parts are then joined and one of the sheets is formed, with a hammer, on to the other sheets and the soft filler, acquiring the format illustrated in FIGS. 4 and 5.

A third type of known gasket is the non-metallic, or cut, gasket, the simplest and most abundant in industry. Such type of gasket 23, shown in FIG. 6, is cut from gasket sheet, and according to the drawings of the flanges or equipment. The packing sheet is made of the most varied materials, such as graphite, PTFE, aramid fiber, nitrilic rubber derivatives and asbestos (currently in disuse).

The processes of manufacture of these gaskets utilize blades, installed in eccentric or hydraulic presses, which cut such laminates in the formats determined for the gaskets.

The main market for the three types of gaskets above lies in the area of maintenance, there being a variety of types, forms, sizes, materials and applications that, when combined, easily lead the consumer to have to deal with thousands of items. Allied to this is the fact that, during a turn around at a petrochemical plant, a pulp and paper mill, or a refinery, rarely are the gaskets to be changed in the piping, heat exchangers or other equipment known until these are disassembled.

There being a need to replace gaskets, a purchase order for new gaskets is made. However, the delivery of these gaskets from the specialized companies may exceed the machinery maintenance period, thereby delaying the restart of operations and incurring obvious losses.

Another possibility would be to stock various gaskets, which would also be costly.

Thus, it is an objective of the present invention to provide a portable platform to allow the manufacture of gaskets within the production unit, as required, without any need for keeping stocks, consequently reducing costs, besides minimizing the risk of delaying the resumption of productive activities after a gasket leak problem.

A further objective of the present invention is to provide a portable platform, which may be transported from one place to another, in order to accelerate the process of gasket replacement.

When the delivery of an ordered gasket is delayed, there is a risk that the old gasket may be reused and cause a leak, which may, depending on the substance, cause environmental impact.

It should also be taken into account that industrial plants with a high gasket consumption tend more and more to be set up outside the major urban centers, which makes a locally installable machine, which is simple to operate and capable of a broad versatility of types and sizes, a strong distinguishing factor in relation to the competition, as stated above.

BRIEF DESCRIPTION OF THE INVENTION

The objectives above, among others, are achieved by means of a portable platform for use in the manufacture of gaskets, comprising a shaft, connected to a motor, has the capability of receiving at least one mandrel, and a surface to receive, at least one molding tool, the mandrel being activated by the motor to revolve in relation to the platform and to the tool, and to move gasket-forming elements, such as metallic and non-metallic strips, among others, to be processed by the tool.

According to the present invention, in order to enable a single platform to make different types of gaskets, as much the mandrel as the tool can be changed respectively among mandrel and tools with the following different characteristics, especially those listed below. This enables, therefore, a single platform to make different types of gaskets.

a) A mandrel consisting of a first roller, connected to the motor shaft, and a tool consisting of a set assembly formed of a support base, mounted on a surface of the platform and supporting a compressed air piston, such that its movable tip is connected to a second roller, free to turn. The piston has the purpose of moving the second roller so that its side edges press the elements moved against the side edges of the first roller, pressing them so as to turn them into spiraled gaskets.

b) The mandrel consisting of a first roller, connected to the motor shaft. The tool consisting of an assembly formed of a support base, mounted on a platform surface and supporting a rack that moves a pair of rollers against the first roller. The rack is connected to a rod, at the ends of which the two rollers are respectively attached, such that these are moved by the rack, activated by a lever, so that its side edges press the gasket-forming elements against the side edges of the first roller, such that it presses them, forming a double jacketed gasket.

c) A mandrel consisting of a turntable to place the referred elements and the tool comprising a rod attached to the platform surface and supporting a device for cutting the elements, while they are turned by the plate. In this way, gaskets of the non-metallic or cut type are produced.

Due to the fact that as much the mandrel as the tools may be respectively changed for other mandrels and tools with different characteristics, different types of gaskets may be manufactured, especially, spiral wound, double jacketed and cut non-metallic gaskets on the same platform. Thus, this platform may be moved inside the production unit, in which machines that use such gaskets are installed, and, consequently, speed up and facilitate the gasket replacement process.

As it is a platform conceived to operate in diverse environments, in preferred embodiments, there are separations S inside the body of the platform for the most usual tools T, such as pliers, spanners, sanding tools, welding electrodes, etc., complementing the concept of portability and self-sufficiency in diverse environment.

SUMMARIZED DESCRIPTION OF THE DRAWINGS

The present invention will later be described in more detail, based on an example of execution represented in the drawings. The figures show:

FIG. 1—is a perspective view of a spiral wound gasket.

FIG. 2—is a cross-section view of a spiral metallic gasket utilized in flanges of the tongue and the groove type.

FIG. 3—is a cross-section view of a spiral metallic gasket utilized in flanges of the male or female type.

FIG. 4—is a cross-section view of a double jacketed gasket utilized in flanges of the tongue and groove type of a heat exchanger.

FIG. 5—is a view of the top of a plurality of double jacketed gaskets.

FIG. 6—is a perspective view of a cut gasket.

FIG. 7—is a perspective view of an embodiment of the main platform and the auxiliary platform.

FIG. 7A is another perspective view of the embodiment shown in FIG. 7, showing separations located inside the body of the platform.

Figure 8:
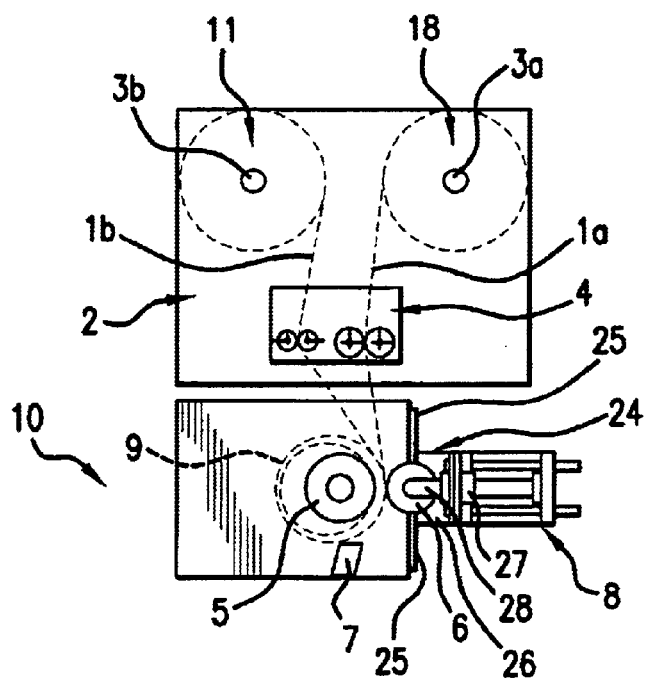

FIG. 8—is top view of the main platform and the auxiliary platform assembled to produce spiral wound gaskets.

Figure 9:
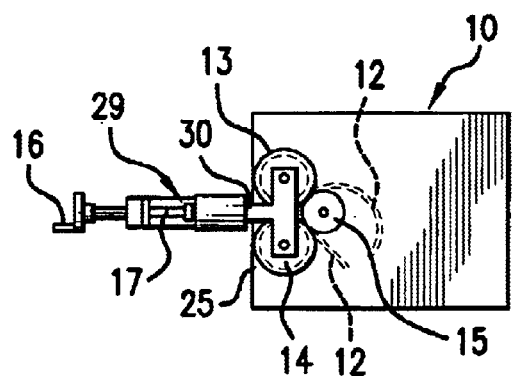

FIG. 9—is top view of the main platform assembled to produce double jacketed gaskets.

Figure 10:
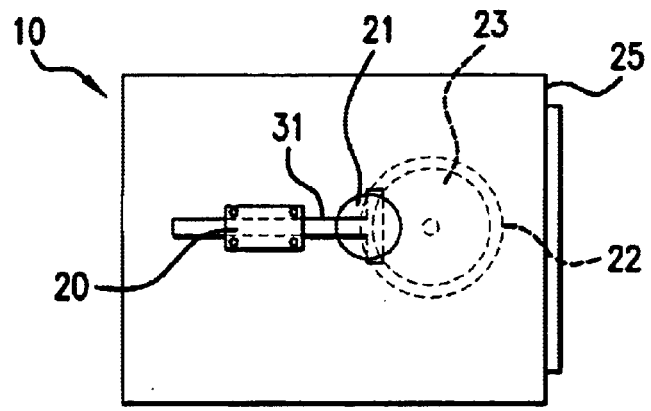

FIG. 10—is top view of the main platform assembled to produce cut non-metallic gaskets.

DETAILED DESCRIPTION OF THE FIGURES

A description of FIGS. 1 to 6 is in the description of the field of invention.

Regarding FIGS. 7–10, these show embodiments of tools present in the platform that is the object of the present invention.

FIGS. 7 and 8 illustrate a preferred embodiment for a first assembly of the present invention, designed to manufacture gaskets of the spiral wound type.

An auxiliary platform 2, containing two rolls 11 and 18, spaced apart, one roll being of a metallic strip 1a, preferably of stainless steel, and the other roll is of a soft filler strip 1b, preferably graphite or PTFE, like that described in the field of the invention. The rolls 11 and 18 are held by respective axles 3a and 3b attached to main platform 10.

Two pairs of rollers 4 are also placed on the auxiliary platform 2, set apart from each other, such that they guide and form the metallic 1a and filler 1b strips, when these are being unrolled from rolls 11 and 18. In particular, each pair of rollers 4 possesses cooperative side edges between them and with a transversal chevron V-section. Thus, the rollers form the strips so that they have a transversal chevron V-section Moreover, the strips are kept taut and apart, thereby preventing entanglement, when they are being unrolled from the respective rolls.

The main platform 10 has the format of a locker or cabinet, as illustrated in FIG. 7, housing the motor (not shown) and, as already stated, it is placed adjacent to auxiliary platform 2. The main platform 10 comprises a shaft (not shown) connected to the motor, at one end, and the first roller 5, at the other end. The shaft protruding through an opening in the upper surface superior of the platform 10 to receive roller 5. In addition, the shaft has an opening at its upper end to receive a fixing bolt (not shown) for roller 5. Thus, when the motor is activated, roller 5 begins to turn, rolling strips 1a, 1b around itself and forming a spiral.

Furthermore, the lateral surface 25 of platform 10 is prepared to receive a tool with a second roller 6 so that, in conjunction with the first roller 5, they bend and press strips 1a, 1b coming from the pairs of rollers 4 on the auxiliary platform 2. The side edges of rollers 5 and 6 also possess a transversal "V" section, which are cooperative with one another, when they press the referred strip to form them.

A tool with a second roller 6 is attached to the lateral surface 25 of the main platform 10 so that, together with the first roller 5, they form the strips 1a, 1b coming from the additional platform 2. This tool consists of an assembly formed of a support base 24, similar to an angle bracket and attached to the lateral surface 25 of the platform 10, by means of bolts (not shown). A compressed air piston 8 is located on a top surface 26 of the base 24, which is not in contact with platform 10, the mobile end 27 of the piston 8 is connected to the second roller 6, by means of a fork 28 with a transversal pin (not shown). Furthermore, the pin allows the roller 6 to turn freely.

The piston 8, when activated, presses the second roller 6 against the first roller 5, such that the side edges of both press the strips 1a, 1b, one against the other, such that they are rolled together around roller 5, forming a horizontal spiral.

The quantity of turns to be made by the strips may vary, depending on the purpose and the dimensions of the spiraled gasket to be produced. Anyway, electrodes 7 are provided on the main platform 10 to weld the strips 1a and 1b, at the beginning and end of the rolling, such that the strips remain in the form of a spiral 9, without undoing themselves, when removed from roller 5.

This embodiment of tool may be easily moved from one region to another, enabling the manufacture of spiral wound gaskets in the production units themselves, in which the machines that use this type of gasket operate.

When, however, there is a need to manufacture another type of gasket, for example, a double jacketed gasket, like that shown in FIG. 5, the bolt (not shown) that fixes roller 5 on the motor shaft, as well as those that fix the base 24 on the surface 25 of the platform 10, are removed, such that as much the tool with the second roller, as the first roller are detached from platform 10.

As illustrated in FIG. 9, a new roller and a tool are attached on the same platform 10, so as to produce another type of gasket, the double jacketed gasket, which, as stated above, is manufactured from two metallic sheets that are formed over a filler of soft non-metallic material, as shown in FIG. 4. Although FIG. 9 shows the lateral surface 25 is in the left side, the platform 10 in this figure is the same platform shown in FIGS. 8 and 10

Before being processed on the present platform, strips are produced by diverse known techniques of the state of the art, for example, by means of a plurality of rollers, which form a rectilinear strip having external metallic layers and an internal filler of soft non-metallic material with the transversal section shown in FIG. 4.

A metallic sheet normally possesses a thickness from 0.4 mm to 0.5 mm. The choice is determined by specific technical recommendations. Moreover, the standard filling material is graphite. Depending on the operating conditions, the following can also be used as filler: a metal, ceramic fiber or PTFE.

In FIG. 9, the new roller 15 is attached to the motor shaft (not shown), just as the tool is attached to the lateral surface 25 of the platform 10, by means of bolts (not shown). In addition, two freely rotating rollers 13 and 14 are placed side by side to press the strips against roller 15. These rollers possess substantially concave edges to form the strips 12 with edges substantially rounded.

The tool consists of an assembly formed by a support base 29, in the form of an angle bracket and attached to the lateral surface 25 of the platform surface 10, by means of bolts (nor shown). On this base, a rack 17 is placed and connected to one end of a T-shaped rod 30, while each one of the two rollers 13, 14 is respectively attached to the other ends of this rod 30. Thus, the rollers 13, 14 remain symmetrically placed in relation to the body of the rod 30.

Activated by a lever 16, the rack 17 moves the rod 30, and, consequently, the rollers 13, 14, in order to roll the strips 12 against roller 15 or move them away from this. As they are rolled, the strips are rolled until they make a complete turn around roller 15, whereupon they are cut and the ends welded, forming a ring or a double jacketed gasket. When it is desired that a plurality of gaskets be produced, this can be effected by having the strips make several turns around the roller, thereby optimizing the productive process. In this manner, a spiral is made around roller 15, and the process of cutting and welding repeated, according to the number of gaskets required.

Once again, when it is required to produce another type of gasket, such as, a non-metallic gasket, as shown in FIG. 6, the bolt that holds roller 15 on the motor shaft, as well as those that fix the base to the platform surface, are removed, such that as much the tool with the two rollers 13, 14 as the roller 15 are detached from platform 10.

As illustrated in FIG. 10, turntable 22 and a new tool are attached on the same platform 10, so as to produce another sort of gasket, of the non-metallic type, which, as mentioned, is manufactured from laminates of materials, like rubber, cork, cardboard, among others.

Turntable 22, for placement of sheets of materials 23, like rubber, cork, cardboard, among others, is bolted on to the motor shaft. In addition, a rod supporting a blade or another cutting device is attached to the platform surface. Thus, the blade is brought towards the turntable to cut the sheet, for example, rubber, as the turntable revolves, driven by the motor.

The support rod 31 is attached to the platform surface by means of support 20, which is fixed in relation to the platform 10, whereas the rod 31 is mobile in relation to the support 20, so as to move the cutting device or blade 21 closer or further away from the turntable 22.

The manufacturing process for a non-metallic gasket is relatively simple, consisting basically of cutting, as described above, of a sheet 23. Thus, it can be seen that the third platform assembly of the present invention allows fabrication of a third gasket type.

In this preferred embodiment, platform 10 has the format of a cupboard or cabinet, in which there are separations for the most usual tools (pliers, spanners, sanders, welding electrodes, etc), complementing the concept of portability and self-sufficiency in diverse environments.

The present invention provides production, in diverse environments, of the gaskets most used for sealing, as demand arises, without the need for holding large costly stocks, as well as minimizing the risk of delaying resumption of production in dealing with a stoppage caused by a leaking gasket. Additionally, it can prevent leakage due to the forced reuse of old gaskets, and, consequently, eventual environmental impacts.

Having described examples of preferred embodiments of the invention, it should be understood, as mentioned above, that the scope of the present invention covers other possible variations, limited only by the content of the claims.

What is claimed is:

1. A portable platform for use in the manufacture of gaskets, comprising:
   a shaft connected to a motor and to a first roller; and
   a molding tool comprising a support base mounted on a surface of said portable platform, said support base supporting a rack activated by a lever and connected to two rollers, said rollers being free to turn and being adjacently disposed,
   wherein the lever induces the two rollers against the first roller by means of the rack, and, consequently, side edges of the two rollers press gasket-forming elements against side edges of the first roller.

2. The portable platform according to claim 1, wherein the support base comprises an angle bracket connecting the molding tool to said surface.

3. The portable platform according to claim 2, wherein the first roller is connected to said shaft and the angle bracket is connected to said surface by means of bolts.

4. A portable platform according to claim 1, wherein the two rollers and the first roller possess concave edges to mold the gasket-forming elements into a substantially round form.

5. A portable platform according to claim 1, wherein the gasket-forming elements comprises two metallic strips with a third strip between them.

6. A portable platform according to claim 1, further comprising a rod connecting said rack to said two rollers.

7. A portable platform according to claim 1, further comprising an outer body with an interior storage space having sub-spaces defined by separations.

8. A portable platform for use in gasket manufacturing, comprising:

a shaft connected to a motor and to receive at least one mandrel; and a surface to receive at least one tool, wherein the mandrel is activated by the motor to turn in relation to the platform and to the tool, and to move gasket-forming elements to be processed by the tool, and the mandrel and the tool are replaceable respectively between the following mandrels and tools:

a) a mandrel comprising a first roller connected to the shaft and a first tool comprising a support base mounted on said platform surface and supporting a compressed air piston whose rod is connected to a second roller which turns freely, the piston inducing the second roller so that side edges of the second roller press said gasket-forming elements against side edges of the first roller;

b) a mandrel comprising a first roller connected to said shaft, and a second tool comprising a support base mounted on said platform surface and supporting a rack activated by a lever and connected to a rod at whose ends two rollers are respectively attached, such that the two rollers are moved by said rack in relation to the first roller, such that side edges of the two rollers press the gasket-forming elements against side edges of the first roller; and c) a mandrel comprising a turntable for placement of the gasket-forming elements and a third tool comprising a rod with one end attached to said surface and the other end supporting a cutting device to cut the gasket-forming elements as they are revolved by the turntable.

* * * * *